A. J. HALL.
CONTROL SYSTEM.
APPLICATION FILED JAN. 5, 1916.
1,289,162.
Patented Dec. 31, 1918.
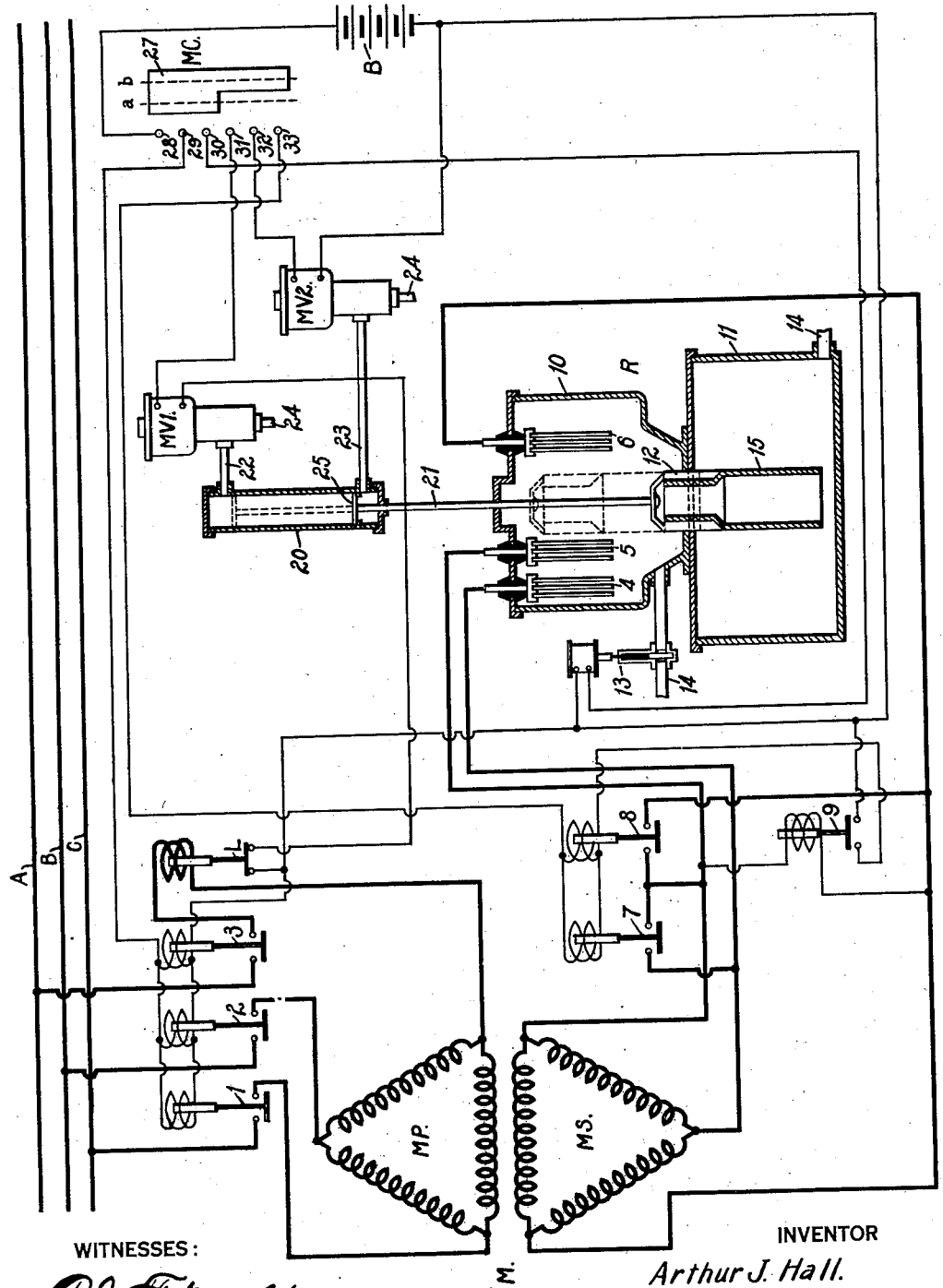
WITNESSES:
R. J. Fitzgerald
W. E. M...
INVENTOR
Arthur J. Hall.
BY
Wesley G. Carr
ATTORNEY

UNITED STATES PATENT OFFICE.

ARTHUR J. HALL, OF WILKINSBURG, PENNSYLVANIA, ASSIGNOR TO WESTINGHOUSE ELECTRIC AND MANUFACTURING COMPANY, A CORPORATION OF PENNSYLVANIA.

CONTROL SYSTEM.

1,289,162.

Specification of Letters Patent.   Patented Dec. 31, 1918.

Application filed January 5, 1916.   Serial No. 70,439.

*To all whom it may concern:*

Be it known that I, ARTHUR J. HALL, a subject of the King of Great Britain, and a resident of Wilkinsburg, in the county of Allegheny and State of Pennsylvania, have invented a new and useful Improvement in Control Systems, of which the following is a specification.

My invention relates to control systems for dynamo-electric machines and particularly to such systems as are adapted to govern the operation of polyphase induction motors and the like through the agency of adjustable liquid rheostats.

One object of my invention is to provide a system of the above-indicated class that shall effectively protect the motor and motor equipment against an insufficient supply of liquid for the rheostat.

Another object of my invention is to provide a simple and effective interlock for induction-motor short-circuiting switches which shall not permit of the closing thereof unless the terminal voltage of the secondary motor winding is less than a predetermined small value.

A third object of my invention is to provide an interlocking device for the rheostat and short-circuiting switches which shall be independent of the amount of electrolyte in the rheostat and of the splashing thereof.

A fourth object of my invention is to provide a switch-interlocking means which shall permit the electrolyte to be fed into the tank at any desired velocity.

Heretofore, short-circuiting switches for liquid rheostats have been provided with interlocking devices which were controlled by float mechanisms or which depended for the actuation thereof upon the height of the electrolyte within the respective tanks. Such interlocking devices do not vary in accordance with changes in the density of the electrolyte; they give an unreliable contact by reason of the splashing and agitation of the surface of the electrolyte; and they require a considerable difference in the level of the electrolyte for the actuation of the interlocking switches.

My present invention provides an interlocking device for the secondary short-circuiting switches which is directly dependent upon the terminal voltage of the secondary winding of the motor.

The single figure of the accompanying drawing, is a diagrammatic view of a control system embodying my invention and comprises an electric motor M which is adapted to receive energy from supply-circuit conductors A—B—C and to be governed by a suitable master controller MC through the agency of a liquid rheostat R, a plurality of switching devices 1 to 6, inclusive, and a source of energy, such as a battery B, for actuating the associated control apparatus.

The electric motor M is of a polyphase induction type and comprises a primary member MP which is connected directly to the supply circuit A—B—C by suitable electrically-governed switches 1, 2 and 3 and a secondary member MS which is connected to the electrodes 4, 5 and 6 of a liquid rheostat R and is provided with a plurality of short-circuiting switches 7 and 8 and an interlocking relay 9.

The liquid rheostat R comprises a main tank 10 and an auxiliary liquid-storage tank 11 which is joined thereto and has an intercommunicating passageway which constitutes an outlet port 12 extending therebetween. The main tank 10 is provided with a plurality of coöperating electrodes 4, 5 and 6, an electrically-controlled inlet valve 13 which, when energized, establishes a connection from a supply pipe 14 to the tank 10 and thereby controls the admission of electrolyte thereto, and a suitable outlet valve member 15 for controlling the level of the electrolyte within the tank 10.

The valve member 15 is movably mounted within the aperture or outlet port 12 and is provided with a main portion and a concentrically-disposed portion of smaller cross section. When the valve member 15 is positioned as shown in the drawing, liquid from the main tank 10 is discharged through the outlet port 12 and around the smaller portion of the valve member 15, but, when the valve member 15 is raised to the position indicated by the dotted outline thereof, the outlet port 12 through the bottom of the tank 10 is closed and the liquid can escape only over the top of the valve member 15 which thereby determines the level of the liquid within the tank 10.

A suitable fluid-actuated device 20 is provided to raise and lower the valve member 15 and is operatively connected thereto by a rod 21. Suitable fluid magnet-valves MV1 and MV2 are adapted to admit fluid, under pressure, into the cylinder of the device 20 through the ports 22 and 23.

When the magnet-valves MV1 and MV2 are both deënergized, the magnet valve MV1 is adapted to admit fluid, under pressure, from a supply pipe 24 through the port 22 to the upper side of an actuating piston 25, and the valve member MV2 is adapted to establish a connection from the port 23 to the atmosphere. When both valves are energized, the valve MV1 establishes a connection from the port 22 to the atmosphere and the valve MV2 admits fluid, under pressure, from the supply pipe 24 through port 23 to the under side of the piston 25. It will therefore be seen that, when both valves are deënergized, the piston will be biased to the downward position thereof, when both are energized, the piston will be biased to the upward position and when the valve MV1 is deënergized and the valve MV2 is energized, the piston will be restrained in the position held when valve MV1 was deënergized by reason of the balanced pressures on the upper and lower sides of the piston member 25.

A limit switch L, which is adapted to assume an open position when the current through the primary winding MP of the motor exceeds a predetermined amount, successively interrupts the energizing circuit for valve MV1 and thereby governs the movements of the valve member 15.

An interlocking relay 9 is provided to protect the motor M against a premature closing of the short-circuiting switches 7 and 8. The exciting coil of relay 9 is connected in shunt relation to one phase of the induction-motor secondary MS and is adapted to actuate relay 9 to an open position when the voltage impressed across the exciting coil of the relay exceeds a predetermined small amount. The contact members of the relay 9 are connected in series-circuit relation with the energizing coils for the electrode-bridging switches 7 and 8, which are grouped in parallel-circuit relation, and thus prevent the closure thereof until the potential difference of the electrodes 5 and 6 (or the voltage across one phase of the motor secondary MS) decreases to a predetermined small amount.

The energizing coils for the various control devices referred to are enegrized from a suitable source of energy, such as a battery B, and the various circuits therefor are arranged by a master controller MC that is provided with a conducting segment 27 and is adapted to assume a plurality of operating positions indicated by the dotted lines a and b. A plurality of stationary contact members 28 to 33, inclusive, are adapted to coöperate with the conducting segment 27 and to thereby establish the various control circuits referred to in a predetermined desired sequence.

Assuming that the apparatus is as shown in the drawing and that the master controller MC has been moved into the position a, it will be seen that the engagement of the contact members 28, 29 and 30 and the conducting segment 27 of the controller establishes a circuit from the positive terminal of the battery B through contact members 28, conducting segment 27, which is positively energized thereby, contact member 29 and the energizing coils for switches 1, 2 and 3, which are thereby closed, to the negative terminal of the battery B. A circuit is established also from the positively-energized conducting segment 27 through the contact member 30 and the actuating coil of the liquid-inlet valve 13 to the negative terminal of the battery. The primary motor-winding MP is thus connected directly to the supply-circuit conductors A—B—C through the closed switches 1, 2 and 3 and the inlet valve 13 is opened to admit liquid to the rheostat R. The connection of the primary winding MP to the supply-circuit conductors A—B—C causes a voltage to be induced in the various phases of the secondary winding MS and, since the actuating coil of the relay 9 is connected across one phase of the secondary winding MS, the relay 9 will be energized and actuated to an open position.

When the controller is moved to position b, the positively-energized conducting segment 27 engages contact members 31, 32 and 33 and thereby establishes a circuit from contact member 31 through the energizing coil of magnet valve MV1 and the contact members of the limit switch L to the negative terminal of the battery B and from contact member 32 through the energizing coil of magnet valve MV2 to the negative terminal of the battery B. The energization of the magnet valves MV1 and MV2 causes the piston 25 to immediately raise the valve 15 and to thus close the outlet port 12 of the rheostat. The level of the liquid in the rheostat is thus caused to rise to a height corresponding to the position of the outlet valve 15. As soon as the electrodes 4, 5 and 6 are partially immersed, the motor M1 is started into operation. The motor is acclerated by the continued raising of the valve member 15, and the rate of accleration is governed by the limit switch L, as hereinbefore set forth.

As the electrolyte continues to rise in the tank 10, the potential difference of the electrodes 4, 5 and 6 is decreased until a sufficiently small value is reached to permit of the closure of the short-circuiting switches 7 and 8. The relay 9 is adjusted to drop to a closed position for this value of voltage and to thereby complete an energizing circuit for the short-circuiting switches 7 and 8 from the conducting segment 27 through contact member 33, actuating coils of switches 7 and 8, grouped in parallel relation, and the contact-bridging member of relay 9 to the negative terminal of the battery B.

The induction motor M is thus disposed in full-operating condition, with the secondary winding MS short circuited by the switches 7 and 8.

It will readily be seen that such an interlocking device as I have hereinbefore described depends for its action directly upon the motor conditions instead of upon the height of the electrolyte in the tank 10 or other auxiliary means that heretofore have been employed to interlock the electrode-bridging switches of liquid rheostats.

While I have described my invention in a simple and preferred form, it is not necessarily so limited and I desire, therefore, that only such limitations shall be imposed as are indicated in the appended claims.

I claim as my invention:

1. The combination with an induction motor having a wound secondary, a liquid rheostat in the secondary circuit thereof, means for operating said rheostat in accordance with the current supplied to the motor, and electrically-controlled switches for short-circuiting said rheostat, of a relay that is adapted to complete the circuit for said short-circuiting switches when the terminal voltage of the secondary winding is less than a predetermined slight amount.

2. The combination with a dynamo-electric machine having a rotor winding, variable translating devices connected in circuit with said winding, means for operating said devices in accordance with the current supplied to the motor, and normally open electrically-controlled switches for excluding said translating devices from circuit, of a relay device controlled by the voltage of said rotor winding for completing the energizing circuit of said switches under predetermined voltage conditions of said rotor winding.

3. The combination with a dynamo-electric machine having a stator and a rotor winding, and a liquid rheostat connected to said rotor winding and having a plurality of coöperating electrodes, of means for gradually immersing said electrodes in accordance with predetermined current conditions, normally inoperative means for short-circuiting said electrodes, and means dependent upon rotor-winding voltage conditions for actuating said short-circuiting means.

4. The combination with a dynamo-electric machine having a stator and a rotor winding, and a liquid rheostat connected to said rotor winding and having a plurality of coöperating electrodes, of a limit switch energized in accordance with the load current of said machine for effecting a gradual immersion of said electrodes, normally open electrically-controlled switches for short-circuiting said electrodes, and a relay device dependent upon rotor-winding voltage conditions for completing the energizing circuits of said switches.

In testimony whereof I have hereunto subscribed my name this 30th day of Dec., 1915.

ARTHUR J. HALL.